US012671475B2

(12) United States Patent
Chen et al.

(10) Patent No.: US 12,671,475 B2
(45) Date of Patent: Jun. 30, 2026

(54) METHOD AND APPARATUS FOR REPORTING AND RECEIVING CSI, AND TERMINAL DEVICE AND NETWORK DEVICE

(71) Applicant: GUANGDONG OPPO MOBILE TELECOMMUNICATIONS CORP., LTD., Dongguan (CN)

(72) Inventors: Wenhong Chen, Dongguan (CN); Yun Fang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 670 days.

(21) Appl. No.: 18/146,643

(22) Filed: Dec. 27, 2022

(65) Prior Publication Data

US 2023/0208492 A1 Jun. 29, 2023

Related U.S. Application Data

(63) Continuation of application No. PCT/CN2020/113101, filed on Sep. 2, 2020.

(51) Int. Cl.
H04B 7/06 (2006.01)

(52) U.S. Cl.
CPC ......... H04B 7/0626 (2013.01); H04B 7/0632 (2013.01); H04B 7/0639 (2013.01)

(58) Field of Classification Search
CPC .... H04W 24/08; H04W 48/10; H04L 5/0053; H04L 1/0693; H04L 5/0048;
(Continued)

(56) References Cited

U.S. PATENT DOCUMENTS

| | | | |
|---|---|---|---|
| 2013/0122953 | A1 | 5/2013 | Zhang et al. |
| 2014/0226746 | A1 | 8/2014 | Ko et al. |

(Continued)

FOREIGN PATENT DOCUMENTS

| | | |
|---|---|---|
| CN | 102291228 A | 12/2011 |
| CN | 109391404 A | 2/2019 |

(Continued)

OTHER PUBLICATIONS

3GPP TS 38.212 V16.2.0 (Jun. 2020), 3rd Generation Partnership Project; Technical Specification Group Radio Access Network; NR; Multiplexing and channel coding (Release 16), pp. 47-53.
(Continued)

*Primary Examiner* — Rebecca E Song
(74) *Attorney, Agent, or Firm* — PERKINS COIE LLP

(57) ABSTRACT

A method and apparatus for reporting and receiving CSI, and a terminal device and a network device are provided. The method comprises: a terminal device determining second information in a second CSI portion according to first information in a first CSI portion, wherein the first information is assumption information or two RIs, the assumption information is used for indicating a transmission assumption or a measurement assumption, on which CSI reporting is based, the two RIs are obtained by means of measurement based on different measurement resources, and the second information comprises a PMI and/or a CQI; and the terminal device reporting the CSI, wherein the CSI comprises the first CSI portion and the second CSI portion.

20 Claims, 9 Drawing Sheets

The terminal device determines second information in a second CSI part according to first information in a first CSI part, wherein the first information is assumption information or two RIs, the assumption information is used for indicating a transmission assumption or a measurement assumption on which reporting the CSI is based, the two RIs are obtained by performing measurement based on different measurement resources, and the second information comprises at least one of: a PMI, or a CQI

401

The terminal device reports the CSI, wherein the CSI comprises the first CSI part and the second CSI part

402

(58) Field of Classification Search

CPC .. H04B 7/0626; H04B 7/0632; H04B 7/0456; H04B 7/022; H04B 7/063

See application file for complete search history.

(56) References Cited

U.S. PATENT DOCUMENTS

| | | | | |
|---|---|---|---|---|
| 2018/0254814 A1 | 9/2018 | Park et al. | | |
| 2019/0182697 A1 | 6/2019 | Zhang et al. | | |
| 2020/0112419 A1 | 4/2020 | Bagheri | | |
| 2021/0273709 A1* | 9/2021 | Jiang | ..................... | H04L 5/0091 |
| 2021/0399862 A1 | 12/2021 | Bagheri | | |
| 2022/0094399 A1* | 3/2022 | Gao | ..................... | H04B 7/0658 |
| 2022/0240255 A1* | 7/2022 | Matsumura | ............ | H04B 7/063 |
| 2022/0302976 A1* | 9/2022 | Zhang | .................. | H04L 1/0026 |
| 2022/0304038 A1* | 9/2022 | Zhang | ................... | H04B 7/088 |

FOREIGN PATENT DOCUMENTS

| | | | | |
|---|---|---|---|---|
| CN | 109792620 A | 5/2019 | | |
| CN | 111277360 A | 6/2020 | | |
| JP | 2020502922 A | 1/2020 | | |
| JP | 2021520727 A | 8/2021 | | |
| WO | 2019148399 A1 | 8/2019 | | |
| WO | WO-2019144919 A1 * | 8/2019 | ........... | H04W 72/21 |
| WO | 2020026297 A1 | 2/2020 | | |
| WO | WO-2021038668 A1 * | 3/2021 | ........... | H04B 7/0639 |
| WO | 2021168709 A1 | 9/2021 | | |

OTHER PUBLICATIONS

Notice of Allowance of the Japanese application No. 2023-514484, issued on Dec. 20, 2024. 5 pages with English translation.

First Office Action of the Chinese application No. 202310922488.2, issued on Oct. 9, 2024. 10 pages with English translation.

Nokia: "Corrections to 38.214 including alignment of terminology across specifications in RAN1#98bis", 3GPP Draft; R1-1911545, 3rd Generation Partnership Project (3GPP), RAN WG1, No. Chongqing, China; Oct. 14, 2019-Oct. 20, 2019, Oct. 22, 2019 (Oct. 22, 2019), XP051798809, paragraphs [5.2.1.4.1], [5.2.1.4.2]. 11 pages.

Supplementary European Search Report in the European application No. 20951926.3, mailed on Aug. 1, 2023. 9 pages.

Second Office Action of the European application No. 20951926.3, issued on Jul. 11, 2024. 6 pages.

First Office Action of the Japanese application No. 2023-514484, issued on Jul. 5, 2024. 6 pages with English translation.

Huawei, HiSilicon, Summary for AI 7.1.3.2.2. PUCCH structure in long-duration[online], 3GPP TSG RAN WG1 #92 R1-1803534, Mar. 2, 2018, pp. 1-16.

Office Action of the Indian application No. 202327023937, issued on Feb. 5, 2024. 6 pages with English translation.

First Office Action of the European application No. 20951926.3, issued on Feb. 26, 2024. 6 pages.

Ericsson et al., "Remaining topics of CoMP CQI and Associated CSI Process Definitions", 3GPP TSG-RAN WG1 #70 R1-123828, Aug. 17, 2012 (Aug. 17, 2012).

International Search Report in the international application No. PCT/CN2020/113101, mailed on May 26, 2021.

Written Opinion of the International Search Authority in the international application No. PCT/CN2020/113101, mailed on May 26, 2021.

3GPP TS 38.214 V16.2.0 (Jun. 2020), 3rd Generation Partnership Project; Technical Specification Group Radio Access Network; NR; Physical layer procedures for data (Release 16).

3GPP TSG RAN WG1 #98bis R1-1910865, Chongqing, China, Oct. 14-20, 2019; Source: Ericsson; Title: Remaining issues for mTRP.

3GPP TSG RAN WG1#102-e R1-2006134, e-Meeting, Aug. 17-Aug. 28, 2020; Agenda item: 8.1.4; Source: Samsung; Title: Views on Rel. 17 CSI enhancements.

3GPP TSG RAN WG1 Meeting #102-e R1-2005686, e-Meeting, Aug. 17-28, 2020; Source: CATT; Title: Discussion on enhancements on beam management for multi-TRP.

Qualcomm Incorporated, "CSI enhancements: MTRP and FR1 FDD reciprocity", 3GPP TSG RAN WG1 #102-e R1-2006796, e-Meeting, Aug. 17-28, 2020.

First Office Action of the Korean application No. 10-2023-7010209, issued on Oct. 21, 2025.

* cited by examiner

100

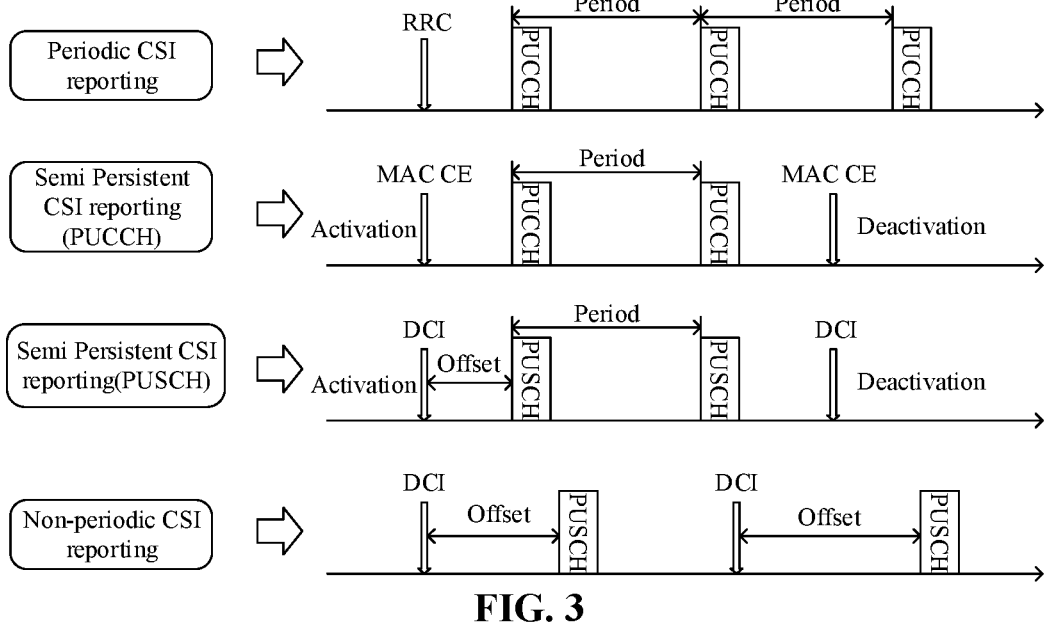

FIG. 3

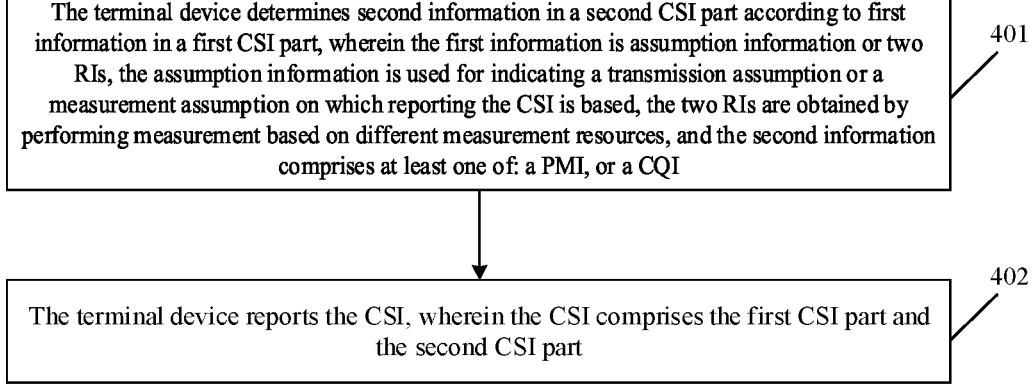

The terminal device determines second information in a second CSI part according to first information in a first CSI part, wherein the first information is assumption information or two RIs, the assumption information is used for indicating a transmission assumption or a measurement assumption on which reporting the CSI is based, the two RIs are obtained by performing measurement based on different measurement resources, and the second information comprises at least one of: a PMI, or a CQI    401

The terminal device reports the CSI, wherein the CSI comprises the first CSI part and the second CSI part    402

The network device configures two groups of CSI measurement resources in a CSI reporting configuration

502

The terminal device performs measurement based on these two groups of CSI measurement resources, determines assumption information, and reports the assumption information through CSI Part 1 that constitutes the CSI

503

The terminal device determines a PMI and/or a CQI included in CSI Part 2 that constitutes the CSI according to the assumption information in CSI Part 1; the assumption information is used for indicating a transmission assumption or a measurement assumption on which reporting the CSI is based

504

The terminal device reports the CSI according to the determined CSI Part 1 and CSI Part 2

FIG. 5

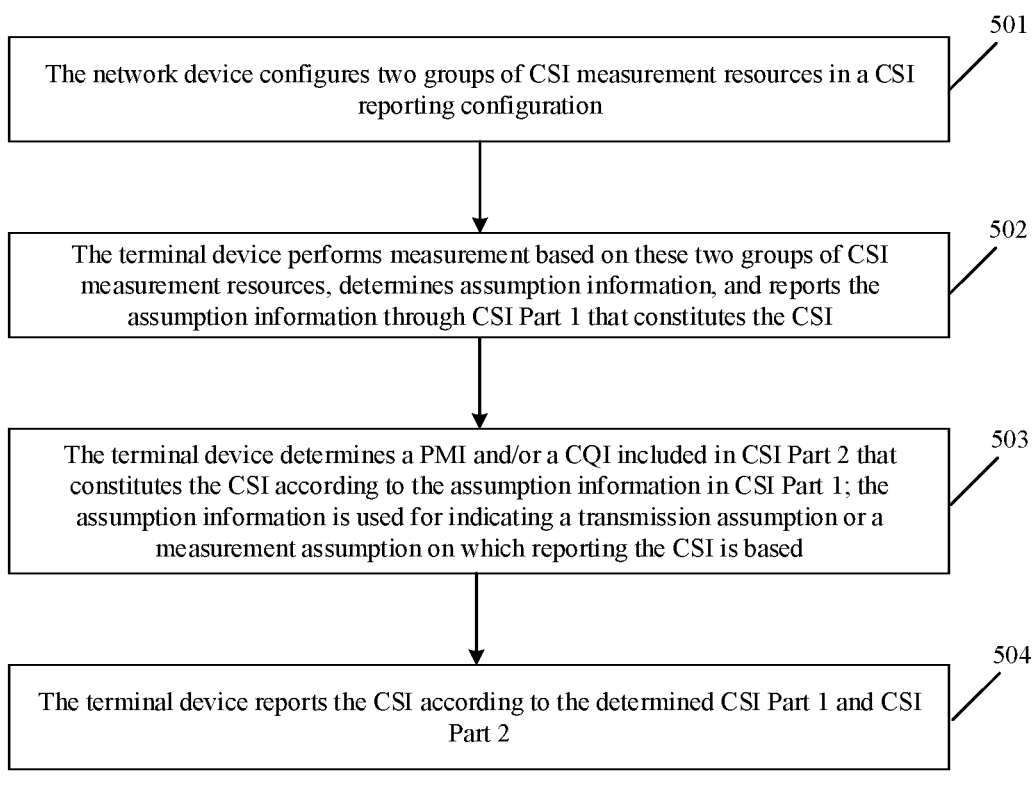

CSI reporting configuration

CSI Part 1

RI, CQI, TAI

PMI

CSI Part 2

Non-zero power CSI-RS resource 0 (CMR0)

CSI-IM resource 0 (IMR0)

Non-zero power CSI-RS resource 1 (CMR1)

CSI-IM resource 1 (IMR1)

First group of CSI measurement resources

Second group of CSI measurement resources

FIG. 6A

CSI reporting configuration

CSI reporting configuration

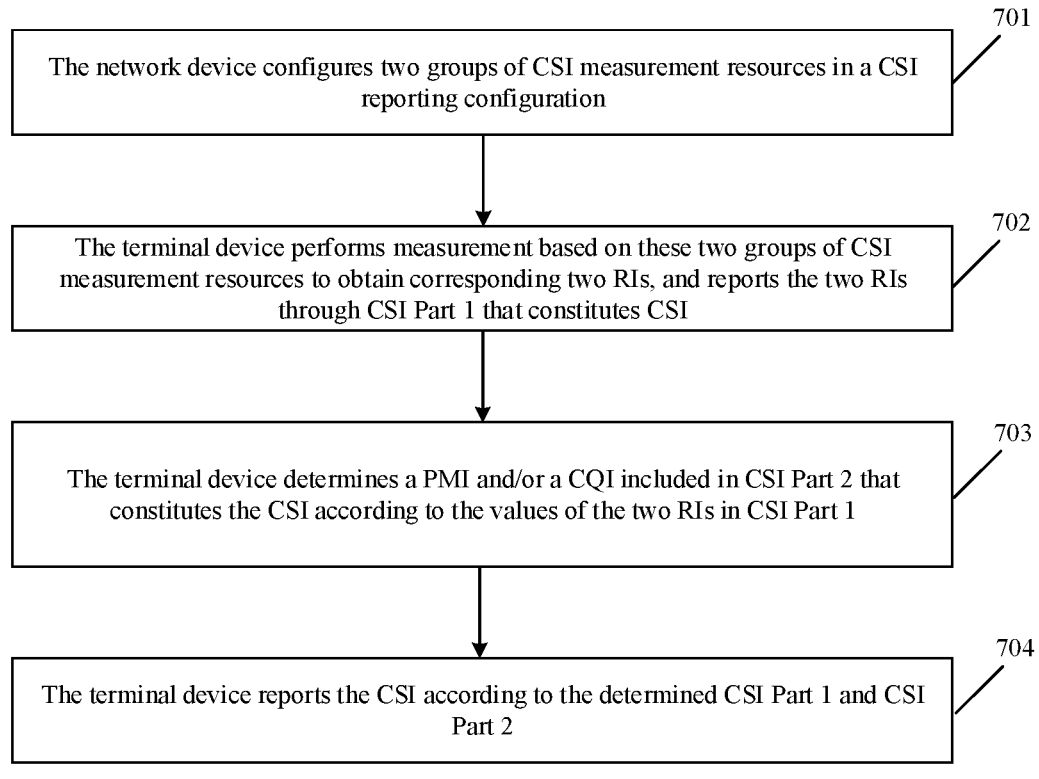

701
The network device configures two groups of CSI measurement resources in a CSI reporting configuration 702
The terminal device performs measurement based on these two groups of CSI measurement resources to obtain corresponding two RIs, and reports the two RIs through CSI Part 1 that constitutes CSI 703
The terminal device determines a PMI and/or a CQI included in CSI Part 2 that constitutes the CSI according to the values of the two RIs in CSI Part 1

704
The terminal device reports the CSI according to the determined CSI Part 1 and CSI Part 2

FIG. 7

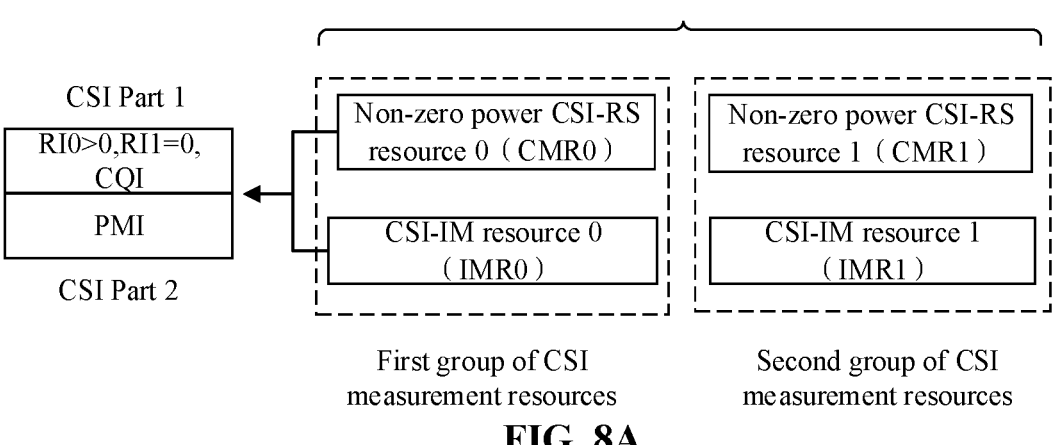

CSI reporting configuration

CSI Part 1

RI0>0,RI1=0, CQI

PMI

CSI Part 2

Non-zero power CSI-RS resource 0 (CMR0)

CSI-IM resource 0 (IMR0)

Non-zero power CSI-RS resource 1 (CMR1)

CSI-IM resource 1 (IMR1)

First group of CSI measurement resources

Second group of CSI measurement resources

FIG. 8A

CSI reporting configuration

CSI reporting configuration

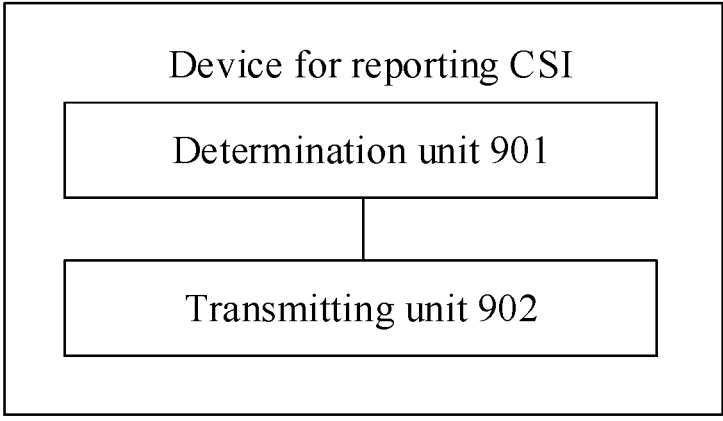
FIG. 9
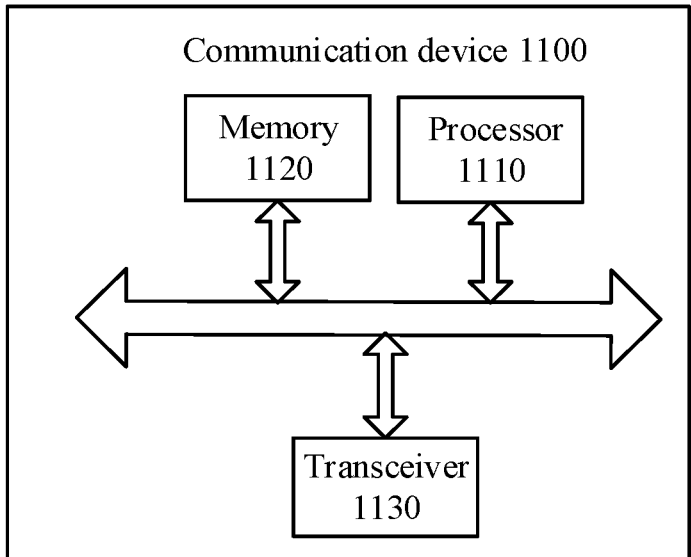
FIG. 10
FIG. 11

METHOD AND APPARATUS FOR REPORTING AND RECEIVING CSI, AND TERMINAL DEVICE AND NETWORK DEVICE

CROSS-REFERENCE TO RELATED APPLICATION

This application is a continuation of International Application No. PCT/CN2020/113101, filed on Sep. 2, 2020, the contents of which are incorporated herein by reference in their entireties.

BACKGROUND

In order to enable a network device to perform scheduling reasonably, a terminal device needs to report CSI, so that the network device determines scheduling information of the terminal device. The terminal device reports the CSI based on a CSI reporting configuration configured by the network device. The terminal device reports one piece of CSI for each CSI reporting configuration. One piece of CSI can only be used for obtaining the channel information of one Transmission/Reception Point (TRP) under one transmission solution.

In order to support a plurality of transmission solutions, the network device needs to configure a plurality of CSI reporting configurations for the terminal device, so that the terminal device reports a plurality of pieces of CSI based on different transmission solutions. However, this reporting method requires a large amount of CSI reporting overhead, which affects the uplink transmission performance. In addition, a great CSI feedback delay will also be introduced, which affects the downlink transmission performance.

SUMMARY

Embodiments of the disclosure provide a CSI reporting and receiving method and device, and a terminal device and a network device.

The method for reporting CSI provided by the embodiments of the disclosure may include the following operations. A terminal device determines second information in a second CSI part according to first information in a first CSI part. The first information is assumption information or two Rank Indicators (RIs). The assumption information is used for indicating a transmission assumption or a measurement assumption on which CSI reporting is based. The two RIs are obtained by performing measurement based on different measurement resources. The second information includes at least one of: a Precoding Matrix Indicator (PMI), or a Channel Quality Indicator (CQI). The terminal device reports CSI. The CSI includes the first CSI part and the second CSI part.

The CSI receiving method provided by the embodiments of the disclosure includes the following operations. A network device receives the CSI reported by a terminal device. The CSI includes a first CSI part and a second CSI part. Second information in the second CSI part is determined based on first information in the first CSI part. The first information is assumption information or two RIs. The assumption information is used for indicating a transmission assumption or a measurement assumption on which CSI reporting is based. The two RIs are obtained by performing measurement based on different measurement resources. The second information includes at least one of: a PMI, or a CQI.

The terminal device provided by an embodiment of the disclosure includes a processor and a memory. The memory is configured to store a computer program, and the processor is configured to call and run the computer program stored in the memory to perform the abovementioned CSI reporting method.

BRIEF DESCRIPTION OF THE DRAWINGS

The accompanying drawings described herein are used to provide a further understanding of the disclosure, and constitute a part of the disclosure. The exemplary embodiments of the disclosure and the description thereof are used to explain the disclosure, but do not constitute improper limitations to the disclosure. In the accompanying drawings:

FIG. 3 is a schematic diagram of different periodic CSI reporting methods provided by an embodiment of the disclosure.

FIG. 4 is a schematic flowchart of a CSI reporting and receiving method provided by an embodiment of the disclosure.

FIG. 5 is a schematic flowchart of a CSI reporting method of a first application example.

FIG. 6A is a first composition diagram of CSI provided by an embodiment of the disclosure.

FIG. 7 is a schematic flowchart of a CSI reporting method of a second application example.

FIG. 8A is a fourth composition diagram of CSI provided by an embodiment of the disclosure.

FIG. 9 is a schematic structural diagram of a CSI reporting device provided by an embodiment of the disclosure.

FIG. 10 is a schematic structural diagram of a CSI receiving device provided by an embodiment of the disclosure.

FIG. 11 is a schematic structural diagram of a communication device provided by an embodiment of the disclosure.

DETAILED DESCRIPTION

The technical solutions in the embodiments of the disclosure are described below with reference to the accompanying drawings in the embodiments of the disclosure. It is apparent that the described embodiments are part rather than all embodiments of the disclosure. All other embodiments obtained by those of ordinary skilled in the art based on the embodiments of the disclosure without inventive efforts shall fall within the scope of protection of the disclosure.

The technical solutions of the embodiments of the disclosure may be applied to various communication systems, for example, a Long Term Evolution (LTE) system, an LTE Frequency Division Duplex (FDD) system, an LTE Time Division Duplex (TDD) system, a 5G (5th generation) communication system, a future communication system, etc.

Figure 1:
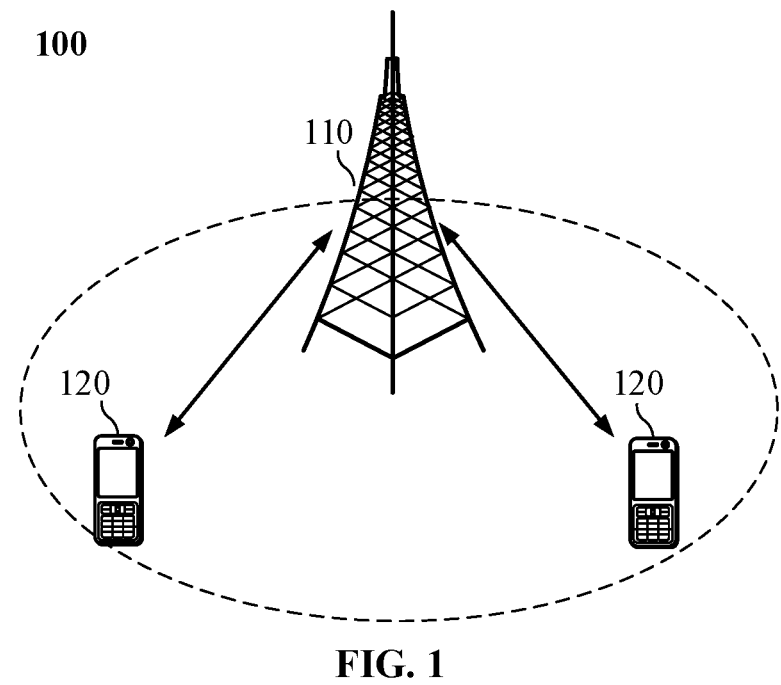
FIG. 1 is a schematic diagram of communication system architecture provided by an embodiment of the disclosure.

Exemplarily, the communication system 100 to which the embodiments of the disclosure are applied is as illustrated in FIG. 1. The communication system 100 may include a network device 110. The network device 110 may be a device in communication with a terminal 120 (or referred to as a communication terminal or a terminal). The network device 110 may provide communication coverage for a specific geographical area, and may communicate with a terminal located within the coverage. Optionally, the network device 110 may be an Evolutional Node B (eNB or eNodeB) in the LTE system or a wireless controller in a Cloud Radio Access Network (CRAN). Or the network device may be a mobile switching center, a relay station, an access point, an on-board device, a wearable device, a hub, a switch, a network bridge, a router, a network-side device in a 5G network, or a network device in a future communication system.

The communication system 100 further includes at least one terminal 120 located within the coverage of the network device 110. A "terminal" used herein includes, but not is limited to, an apparatus arranged to receive/transmit a communication signal through a wired line connection, such as through Public Switched Telephone Network (PSTN), Digital Subscriber Line (DSL), digital cable and direct cable connections, and/or another data connection/network, and/or through a wireless interface, for example, for a cellular network, a Wireless Local Area Network (WLAN), a digital television network like a Digital Video Broadcasting-Handheld (DVB-H) network, a satellite network and an Amplitude Modulated (AM)-Frequency Modulated (FM) broadcast transmitter, and/or a device of another terminal arranged to receive/transmit the communication signal, and/or an Internet of Things (IoT) device. The terminal arranged to communicate through a wireless interface may be referred to as a "wireless communication terminal", a "wireless terminal" or a "mobile terminal". Examples of the mobile terminal include, but are not limited to, satellite or cellular phones, Personal Communications System (PCS) terminals that can combine cellular radiotelephones with data processing, fax, and data communication capabilities, PDAs that can include radiotelephones, pagers, Internet/Intranet access, Web browsers, notebooks, calendars, and/or Global Positioning System (GPS) receivers, and conventional laptop and/or hand-held receivers or other electronic devices including radiotelephone transceivers. The terminal may also be referred to as an access terminal, a User Equipment (UE), a subscriber unit, a subscriber station, a mobile console, a mobile station, a remote station, a remote terminal, a mobile device, a user terminal, a terminal, a wireless communication device, a user agent, or a user apparatus. The access terminal may be a cellular phone, a cordless phone, a Session Initiation Protocol (Session Initiation Protocol, SIP) phone, a Wireless Local Loop (WLL) station, a Personal Digital Assistant (PDA), a hand-held device having a wireless communication function, a computing device or another processing device connected to a wireless modem, an on-board device, a wearable device, a terminal device in a 5G network, a terminal in a PLMN in future evolution, or the like.

Optionally, Device to Device (D2D) communication may be performed between the terminals 120.

Optionally, a 5G communication system or a 5G network may also be referred to as a New Ratio (NR) system or an NR network.

FIG. 1 exemplarily illustrates one network device and two terminal devices. Optionally, the communication system 100 may include a plurality of network devices and the coverage of each network device may include other numbers of terminal devices. No limits are made thereto in the embodiments of the disclosure.

Optionally, the communication system 100 may further include other network entities, such as a network controller and a mobile management entity. No limits are made thereto in the embodiments of the disclosure.

It is to be understood that a device with a communication function in a network/a system in the embodiments of the disclosure may be referred to as a communication device. Taking a communication system 100 as shown in FIG. 1 as an example, the communication device may include a network device 110 and a terminal 120 with a communication function. The network device 110 and the terminal 120 may be specific devices as described above, which will not be elaborated here. The communication device 100 may also include other devices of the communication system 100, for example, other network entities, such as a network controller and a mobile management entity. No limits are made thereto in the embodiments of the disclosure.

It is to be understood that the terms "system" and "network" herein are often used interchangeably herein. The term "and/or" herein is only an association relationship for describing associated objects and indicates that three relationships may exist. For example, A and/or B may indicate the following three cases: Only A exists, both A and B exist, and only B exists. In addition, the character "/" herein generally indicates that the contextual objects are in an "or" relationship.

In order to facilitate the understanding of the technical solutions of the embodiments of the disclosure, the technical solutions related to the embodiments of the disclosure are described below.

Downlink Incoherent Transmission

Downlink and uplink incoherent transmission based on a plurality of TRPs are introduced in a New Radio (NR) system. Backhaul connection between TRPs may be ideal or non-ideal. Under ideal backhaul, the TRPs can perform information interaction quickly and dynamically, while under non-ideal backhaul, the TRPs can only perform information interaction quasi-statically due to a great delay. In the downlink incoherent transmission, the plurality of TRPs may independently schedule a plurality of Physical Downlink Shared Channel (PDSCH) transmissions of one terminal device by using different Physical Downlink Control Channels (PDCCHs). The plurality of TRPs may also schedule a plurality of PDSCH transmissions of one terminal device by using the same PDCCH (which can only be used in the ideal backhaul). The data of different TRPs uses different transmission layers.

Figure 2A:
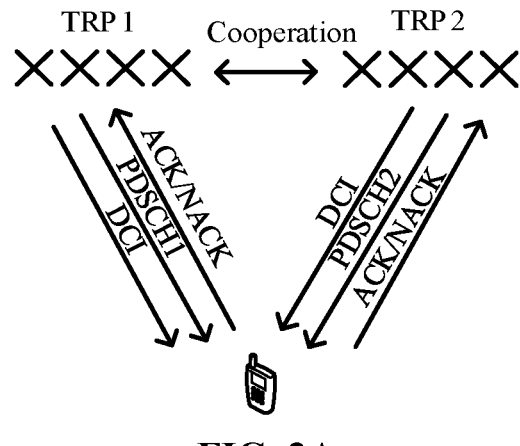
FIG. 2A is a first schematic diagram of downlink incoherent transmission provided by an embodiment of the disclosure.
Figure 2B:
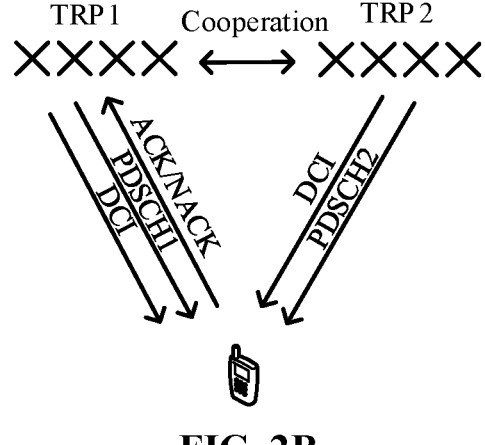
FIG. 2B is a second schematic diagram of the downlink incoherent transmission provided by an embodiment of the disclosure.

For the downlink transmission scheduled by using a plurality of PDCCHs, the scheduled PDSCH may be transmitted in the same time slot or different time slots. The terminal device needs to support simultaneously receiving the PDCCHs and the PDSCHs from different TRPs. When the terminal device feeds back Acknowledge (ACK)/Non- Acknowledge (NACK) and CSI, the ACK/NACK and the CSI may also be fed back to different TRPs transmitting corresponding PDSCHs (as shown in FIG. 2A), or may also be merged and reported to one TRP (as shown in FIG. 2B). The former may be applied to both ideal and non-ideal backhaul scenarios, while the latter can only be applied to an ideal backhaul scenario. Downlink Control Information (DCI) transmitted by different TRPs and used for scheduling PDSCHs can be borne by different Control Resource Sets (CORESETs). That is, the network device configures a plurality of CORESETs, and each TRP uses its own CORESET for performing scheduling, that is, different TRPs may be distinguished through the CORESETs. For example, the network device may configure one index for each CORESET. Different indexes correspond to different TRPs. When the terminal device feeds back the CSI, the CSI corresponding to each TRP needs to be fed back separately. The CSI includes the contents such as a RI, a PMI, and a CQI, and may be used for the respective TRP to perform scheduling of the downlink transmission.

Figure 2C:
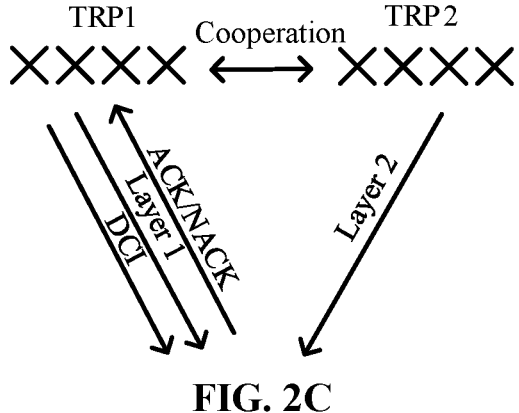
FIG. 2C is a third schematic diagram of the downlink incoherent transmission provided by an embodiment of the disclosure.

For the multi-TRP downlink transmission scheduled by using a single PDCCH, the same piece of DCI may schedule a plurality of transmission layers from different TRPs, referring to FIG. 2C. The transmission layers from different TRPs use Demodulation Reference Signal (DMRS) ports in different Code Division Multiplexing (CDM) groups, and use different Transmission Configuration Indicator (TCI) states. The network device needs to indicate the DMRS ports from different CDM groups in one piece of DCI, and TCI states corresponding to different CDM groups, so as to support different DMRS ports using different beams for transmission. In this case, HARQ-ACK feedback and CSI reporting may reuse mechanisms in existing protocols. This solution can only be used for an ideal backhaul scenario.

Downlink CSI Reporting

In order to enable a network device to perform scheduling reasonably, a terminal device needs to feed back the downlink CSI, so that the network device determines scheduling information of the terminal device, such as the number of transmission layers, a precoding matrix, a transmission beam, and a modulation coding method. Specifically, CSI reporting of the terminal device is performed based on a CSI reporting configuration indicated by the network device. An uplink resource used for the terminal device to report CSI and a downlink reference signal for the terminal to perform CSI measurement are both indicated by the CSI reporting configuration. Each CSI reporting configuration corresponds to one CSI reporting. Each CSI reporting may include the information such as a CSI-RS Resource Indicator (CRI), a RI, a PMI, and a CQI.

The CRI is used for determining a CSI-RS resource currently used for channel measurement from a plurality of CSI-RS resources, and an interference measurement resource (IMR) currently used for interference measurement. Herein, the CSI-RS resource used for the channel measurement may also be referred to as a Channel Measurement Resource (CMR).

The RI is used for reporting the recommended number of transmission layers.

The PMI is used for determining a recommended precoding matrix from a predefined codebook.

The CQI is used for reporting the current channel quality, and may be determined based on a Signal to Interference plus Noise Ratio (SINR) estimated by the terminal device. A channel part in the SINR is determined based on a non-zero power Channel State Information Reference Signal (CSI-RS) resource, which is configured by the network device and used for channel measurement. An interference part is determined based on a Channel State Information Interference Measurement (CSI-IM) resource or a non-zero power CSI-RS resource, which is configured by the network device and used for interference measurement. The CQI is calculated based on the reported RI and PMI.

There are three reporting methods for the terminal device to report the CSI: periodic CSI, quasi-continuous CSI, and non-periodic CSI, as shown in FIG. 3. The periodic CSI is transmitted on a Physical Uplink Control Channel (PUCCH), and its CSI reporting configuration is configured by Radio Resource Control (RRC) signaling. The terminal device periodically reports the CSI after receiving the corresponding RRC signaling. The quasi-continuous CSI may be transmitted on a PUCCH or a Physical Uplink Shared Channel (PUSCH). The CSI reporting configuration corresponding to the CSI transmitted on the PUCCH is preconfigured by the RRC signaling, and is activated or deactivated by Media Access Control (MAC) layer signaling. The CSI reporting configuration corresponding to the CSI transmitted on the PUSCH is dynamically indicated (activated or deactivated) through DCI signaling. After the terminal device receives the activation signaling configured by the network device, the CSI is periodically transmitted on the PUCCH or the PUSCH, and is stopped to be reported until receiving deactivation signaling. The CSI reporting configuration corresponding to non-periodic CSI reporting is also pre-configured through the RRC signaling. Part configuration of the CSI reporting configuration may be activated through the MAC layer signaling, and then the CSI reporting configuration used for the CSI reporting is indicated through CSI trigger signaling in the DCI. After the terminal device receives the CSI trigger signaling, the corresponding CSI is reported at one time on the scheduled PUSCH according to the indicated CSI reporting configuration.

When one piece of CSI bears a large number of bits, in order to prioritize the transmission of important information of the CSI, one piece of CSI may be divided into two parts. For different types of codebooks, the CSI information included in CSI Part 1 and CSI Part 2 is as shown in the following Table 1. The number of bits of CSI Part 1 is fixed, and is used for carrying a small amount of important information such as a RI and a CQI; and the number of bits of CSI Part 2 is determined according to CSI Part 1, and is used for carrying the information with a large number of bits, such as a PMI. When the code rate of an uplink channel (such as a PUSCH or a PUCCH) carrying the CSI exceeds a certain value, the terminal device needs to discard some information in CSI Part 2 to ensure the transmission performance of the uplink channel (at least the bit rate is within a reasonable range). Specifically, the information in CSI part 1 cannot be discarded, and in CSI Part 2, the CSI Part 2 corresponding to the CSI with low priority is discarded first according to the priority of the CSI reporting. The priority of the CSI reporting is determined according to the periodicity of the CSI, the content of the CSI reporting, the carrier corresponding to the CSI reporting, and the Identity (ID) of the CSI reporting configuration.

TABLE 1

| Codebook Type | CSI Part 1 | CSI Part 2 |
|---|---|---|
| Type I codebook | RI, CRI, CQI for 1st CW | PMI, CQI for 2nd CW (RI > 4) |

TABLE 1-continued

| Codebook Type | CSI Part 1 | CSI Part 2 |
|---|---|---|
| Type II codebook | RI, CQI, the number of non-zero broadband amplitude coefficients (respectively coded) | PMI |

A terminal device reports one piece of CSI for each CSI reporting configuration. The CSI is obtained by calculating on the basis of a CMR and an IMR configured by a network device. One piece of CSI can only be used for obtaining the channel information of one TRP under one transmission solution. In order to support single-TRP transmission and multi-TRP downlink incoherent transmission simultaneously, the network device needs to configure a plurality of CSI reporting configurations for the terminal device, so that the terminal device reports a plurality of pieces of CSI based on different transmission solutions. For example, the terminal device respectively obtains the CSI of TRP 1 and CSI of TRP 2 when a single TRP performs scheduling based on the first CSI reporting configuration and second CSI reporting configuration (not considering the interference between TRPs), and respectively obtains the CSI of TRP 1 and CSI of TRP 2 when TRP 1 and TRP 2 perform scheduling simultaneously based on the third CSI reporting configuration and fourth CSI reporting configuration (considering the interference between the TRPs). This reporting method needs a large amount of CSI reporting overhead, which affects the uplink transmission performance. In addition, a great CSI feedback delay will also be introduced, which affects the downlink transmission performance. Therefore, the following technical solutions of the embodiments of the disclosure are proposed.

FIG. 4 is a schematic flowchart of a CSI reporting and receiving method provided by the embodiments of the disclosure. As shown in FIG. 4, the method includes steps S401 to S402.

At step S401, a terminal device determines second information in a second CSI part according to first information in a first CSI part. The first information is assumption information or two RIs. The assumption information is used for indicating a transmission assumption or a measurement assumption on which reporting the CSI is based. The two RIs are obtained by performing measurement based on different measurement resources. The second information includes at least one of: a PMI, or a CQI.

At step S402, the terminal device reports CSI. The CSI includes the first CSI part and the second CSI part.

In the embodiments of the disclosure, the terminal device reports the CSI. Correspondingly, a network device receives the CSI reported by the terminal device. The CSI includes the first CSI part and the second CSI part. Optionally, the network device may be a base station, such as gNB.

In the embodiments of the disclosure, the second information in the second CSI part is determined based on the first information in the first CSI part. Specifically, the terminal device determines the second information in the second CSI part according to the first information in the first CSI part. The first information is assumption information or two RIs. The assumption information is used for indicating a transmission assumption or a measurement assumption on which CSI reporting is based. The two RIs are obtained by performing measurement based on different measurement resources. The second information includes the PMI and/or the CQI.

In an example, the CSI comprises CSI Part 1 (i.e., the first CSI part) and CSI Part 2 (i.e., the second CSI part). The terminal device determines a PMI and/or a CQI included in the CSI Part 2 that constitutes the CSI according to the assumption information in CSI Part 1 of the CSI or the values of the two RIs included in CSI Part 1.

In the abovementioned solution, the assumption information is used for indicating a transmission assumption or a measurement assumption on which CSI reporting is based.

In an optional manner, the assumption information is used for indicating the transmission assumption on which the CSI reporting is based. Specifically, the assumption information is used for indicating whether the CSI reporting is based on the transmission assumption of a single TRP or the transmission assumption of a plurality of TRPs. Herein, the assumption information may also be referred to as transmission assumption information.

In another optional manner, the assumption information is used for indicating the measurement assumption on which the CSI reporting is based. Specifically, the assumption information is used for indicating whether the CSI reporting is based on the measurement assumption of a single measurement resource or the measurement assumption of a plurality of measurement resources. Herein, the assumption information may also be referred to as measurement assumption information.

In the abovementioned solution, the measurement resource may also be referred to as a CSI measurement resource. Further, optionally, the measurement resource includes a CMR and/or an IMR. For example, one measurement resource includes one CMR and one IMR. For example, one measurement resource includes one CMR. For example, one measurement resource includes one IMR.

In the embodiments of the disclosure, the first information is assumption information or two RIs. The technical solutions of the embodiments of the disclosure will be described below with reference to different implementations of the first information.

The first information being assumption information

The terminal device determines a PMI and/or a CQI in the second CSI part according to the assumption information in the first CSI part.

A) The terminal device determines that the second CSI part includes one PMI in a case that the value of the assumption information is a first value.

The value of the assumption information being the first value corresponds to the transmission assumption of a single TRP or the measurement assumption of a single measurement resource. In this case, the second CSI part includes one PMI.

Further, all information in the CSI is obtained by performing measurement based on a single measurement resource. For example, all information in the CSI is obtained by performing measurement based on the first measurement resource.

B1) The terminal device determines that the second CSI part includes two PMIs and k CQI in a case that the value of the assumption information is a second value. The value of k is 0 or 1.

Herein, the second value is different from the first value. In other words, the terminal device determines that the second CSI part includes two PMIs and k CQI in a case that the value of the assumption information is not the first value.

The value of the assumption information being the second value corresponds to the transmission assumption of a plurality of TRPs or the measurement assumption of a plurality of measurement resources. In this case, the second CSI part includes two PMIs and k CQI.

Further, the two PMIs are obtained by performing measurement based on different measurement resources. For example, the first PMI of the two PMIs is obtained by performing measurement based on the first measurement resource, and the second PMI of the two PMIs is obtained by performing measurement based on the second measurement resource.

In an optional manner, the CQI included in the first CSI part is obtained by performing calculation based on the two PMIs in a case that the value of k is 0.

In another optional manner, in a case that the value of k is 1, the CQI included in the first CSI part is obtained by performing calculation based on the first PMI of the two PMIs, and the CQI included in the second CSI part is obtained by performing calculation based on the second PMI of the two PMIs.

In the abovementioned solution, optionally, the value of k is determined according to a CSI reporting configuration corresponding to the CSI, or the number of CORESET group indexes configured by a network device, or the value of the assumption information. For example, the value of k may be indicated in the CSI reporting configuration corresponding to the CSI. For example, when the number of the CORESET group indexes configured by the network device is 1, k=0; and when the number of the CORESET group indexes configured by the network device is 2, k=1. For example, when the value of the assumption information is 1, k=0; and when the value of the assumption information is 2, k=1.

B2) Further, optionally, in a case that the value of the assumption information is a second value, the second CSI part included one RI, and the one RI and the RI included in the first CSI part are obtained by performing measurement based on different measurement resources. For example, the RI included in the first CSI part is obtained by performing measurement based on the first measurement resource, and the RI included in the second CSI part is obtained by performing measurement based on the second measurement resource.

Herein, the sum of the RI included in the second CSI part and the RI included in the first CSI part is less than or equal to the maximum number of transmission layers supported by the terminal device.

B3) Further, optionally, in a case that the value of the assumption information is a second value, the second CSI part includes one CRI, and the one CRI and the CRI included in the first CSI part are obtained by performing measurement based on different measurement resource sets. For example, the CRI included in the first CSI part is obtained by performing measurement based on the first measurement resource set, and the CRI included in the second CSI part is obtained by performing measurement based on the second measurement resource set.

In the abovementioned solution, in an example, the first value is 0, and the second value is 1 or 2.

It is to be noted that B1) in the abovementioned solution may be implemented separately, or may be implemented in combination with B2) and/or B3).

In the embodiment of the disclosure, the code rate of a PUSCH or a PUCCH bearing the second CSI part needs to be less than or equal to a threshold value (referred to as a first threshold value). The terminal device discards at least one piece of a plurality of pieces of information in the second CSI part according to the priority sequence of the plurality of pieces of information in a case that the code rate of the PUSCH or the PUCCH bearing the second CSI part exceeds the first threshold value. The priority corresponding to the discarded information is lower than the priority corresponding to the information not to be discarded. That is, the information with low priority is discarded first until the code rate of the PUSCH or the PUCCH bearing the second CSI part needs to be less than or equal to the first threshold value.

Herein, the priority of the first PMI in the second CSI part is higher than the priority of other information in the second CSI part, and there is a corresponding relationship between the first PMI and the RI of the first CSI part. In other words, the priority of the PMI, in the second CSI part, corresponding to the RI in the first CSI part is higher than the priority of other information in the second CSI part.

The first information being two RIs

The terminal device determines a PMI and/or a CQI in the second CSI part according to the values of the two RIs in the first CSI part.

Herein, the two RIs are obtained by performing measurement based on different measurement resources. For example, the first RI of the two RIs is obtained by performing measurement based on the first measurement resource, and the second RI of the two RIs is obtained by performing measurement based on the second measurement resource.

Herein, the sum of the two RIs is less than or equal to the maximum number of transmission layers supported by the terminal device.

a) The terminal device determines that the second CSI part includes one PMI in a case that the value of the first RI of the two RIs is 0 and the value of the second RI is not 0.

The value of the first RI of the two RIs being 0 and the value of the second RI being not 0 corresponds to the transmission assumption of a single TRP or the measurement assumption of a single measurement resource. In this case, the second CSI part includes one PMI. Herein, the PMI corresponds to the second RI (that is, a non-zero RI).

Herein, both the PMI and the CQI included in the CSI are obtained by performing calculation based on the second RI.

b) In a case that both the value of the first RI of the two RIs and the value of the second RI of the two RIs are greater than 0, the terminal device determines that the second CSI part includes two PMIs and k CQI, and the value of k is 0 or 1. The first PMI of the two PMIs corresponds to the first RI, and the second PMI of the two PMIs corresponds to the second RI.

The values of both the first RI and the second RI of the two RIs being greater than 0 corresponds to the transmission assumption of a plurality of TRPs or the measurement assumption of a plurality of measurement resources. In this case, the second CSI part includes two PMIs and k CQI.

In an optional manner, the CQI included in the first CSI part is obtained by performing calculation based on the two RIs and the two PMIs in a case that the value of k is 0.

In another optional manner, in a case that the value of k is 1, the CQI included in the first CSI part is obtained by performing calculation based on the first PMI of the two PMIs, and the CQI included in the second CSI part is obtained by performing calculation based on the second PMI of the two PMIs.

In the abovementioned solution, optionally, the value of k is determined according to a CSI reporting configuration corresponding to the CSI, or the number of CORESET group indexes configured by the network device. For example, the value of k may be indicated in the CSI reporting configuration corresponding to the CSI. For example, when the number of the CORESET group indexes configured by the network device is 1, k=0; and when the number of the CORESET group indexes configured by the network device is 2, k=1.

Further, optionally, the first CSI part or the second CSI part further includes two CRIs, and the two CRIs are obtained by performing measurement based on different measurement resource sets. For example, one CRI is obtained by performing measurement based on the first measurement resource set, and the other CRI is obtained by performing measurement based on the second measurement resource.

In the embodiment of the disclosure, the code rate of a PUSCH or a PUCCH bearing the second CSI part needs to be less than or equal to a threshold value (referred to as a first threshold value). The terminal device discards at least one piece of a plurality of pieces of information in the second CSI part according to the priority sequence of the plurality of pieces of information in a case that the code rate of the PUSCH or the PUCCH bearing the second CSI part exceeds the first threshold value. The priority corresponding to the discarded information is lower than that corresponding to the information not to be discarded. That is, the information with low priority is discarded first until the code rate of the PUSCH or the PUCCH bearing the second CSI part to be less than or equal to the first threshold value.

Herein, the priority of the first PMI in the second CSI part is higher than the priority of other information in the second CSI part, and there is a corresponding relationship between the first PMI and the first RI of the two RIs included in the first CSI part. In other words, the priority of the PMI (i.e., the first PMI), in the second CSI part, corresponding to the first RI of the two RIs included in the first CSI part is higher than the priority of other information in the second CSI part.

According to the technical solution of the embodiment of the disclosure, the terminal device determines the PMI and/or the CQI included in the second CSI part that constitutes the CSI according to the assumption information in the first CSI part of the CSI or the values of the two RIs included in the first CSI part, so as to report the CSI. By the technical solution of the embodiment of the disclosure, different transmission solutions may be indicated through the first CSI part. The terminal device may report the PMI and/or the CQI, in the second CSI part, corresponding to the indicated transmission solution, so that flexible switching between different transmission solutions can be supported with very low CSI feedback overhead.

The technical solutions of the embodiments of the disclosure are exemplified below in combination with specific disclosure examples. It is to be noted that, in the following disclosure examples, CSI Part 1 corresponds to the first CSI part in the embodiment of the disclosure, CSI Part 2 corresponds to the second CSI part in the embodiment of the disclosure, and the network device in the following disclosure examples may be a base station, such as a gNB.

First Application Example

Referring to FIG. 5, the CSI reporting method of this disclosure example includes the steps S501 to S504.

At step S501, a network device configures two groups of CSI measurement resources in a CSI reporting configuration.

Herein, the two groups of CSI measurement resources respectively correspond to two TRPs that cooperate with each other. Each group of CSI measurement resources includes at least one measurement resource (i.e., at least one CMR and at least one IMR) corresponding to one TRP.

At step S502, the terminal device performs measurement based on these two groups of CSI measurement resources, determines assumption information, and reports the assumption information through CSI Part 1 that constitutes the CSI.

Herein, the assumption information is used for indicating whether the CSI reporting is based on the transmission assumption of a single TRP or the transmission assumption of a plurality of TRPs, or the assumption information is used for indicating whether the CSI reporting is based on the measurement assumption of a single measurement resource or the measurement assumption of a plurality of measurement resources. In an optional manner, if the CSI reporting is based on the transmission assumption of a single TRP or the measurement assumption of a single measurement resource, the CSI reported by the terminal device includes uplink control information corresponding to one TRP or one measurement resource. In another optional manner, if the CSI reporting is based on the transmission assumption of a plurality of TRPs or the measurement assumption of a plurality of measurement resources, the CSI reported by the terminal device includes uplink control information corresponding to the plurality of TRPs respectively or uplink control information corresponding to the plurality of measurement resources respectively, or includes uplink control information obtained by performing joint measurement by the plurality of TRPs or the plurality of measurement resources.

In the present application example, the terminal device may determine assumption information by the following manners: the terminal device may perform CSI measurement based on the transmission assumption of a single TRP and the transmission assumption of two TRPs, respectively, so as to select a superior transmission assumption and determine corresponding transmission assumption information (referred to as assumption information). Or, a terminal may perform CSI measurement based on the measurement assumption of a single measurement resource and the measurement assumption of two measurement resources, respectively, so as to select a superior measurement assumption and determine corresponding measurement assumption information (referred to as assumption information).

It is to be noted that the CSI measurement refers to the measurement for the CMR and/or the IMR. The measurement resource may be replaced with the CMR and the IMR, or replaced with the CMR, or replaced with the IMR.

At S503, the terminal device determines a PMI and/or a CQI included in CSI Part 2 that constitutes the CSI according to the assumption information in CSI Part 1. The assumption information is used for indicating a transmission assumption or a measurement assumption on which reporting the CSI is based.

In order to facilitate describing, the following description is made by taking the assumption information being Transmission Assumption Information (TAI) as an example. The uplink control information included in CSI Part 2 is described below.

In an implementation, when the value of the TAI in CSI Part 1 is a first value, CSI Part 2 includes only one PMI.

In an example, the first value is 0. In this case, the reporting of the CSI is based on the transmission assumption of a single TRP or the reporting of the CSI is based on the measurement assumption of a single measurement resource. As shown in FIG. 5-1, all information in the CSI is obtained by performing measurement based on a first group of CSI measurement resources (i.e., CMR0 and IMR0). The terminal device may report the CSI by reusing the existing CSI reporting mechanism.

As shown in FIG. 6A, CSI Part 1 may include a RI and a CQI, and CSI Part 2 may include one PMI.

Further, optionally, if the value of the RI is greater than 4, CSI Part 2 may further include another CQI. The CQI in CSI Part 1 corresponds to a first codeword, and the CQI in CSI Part 2 corresponds to a second codeword.

In another implementation, when the value of the TAI in CSI Part 1 is a second value, CSI Part 2 includes one two PMIs and k CQI, and k=0 or 1. The two PMIs are obtained by performing measurement based on different measurement resources.

Figure 6B:
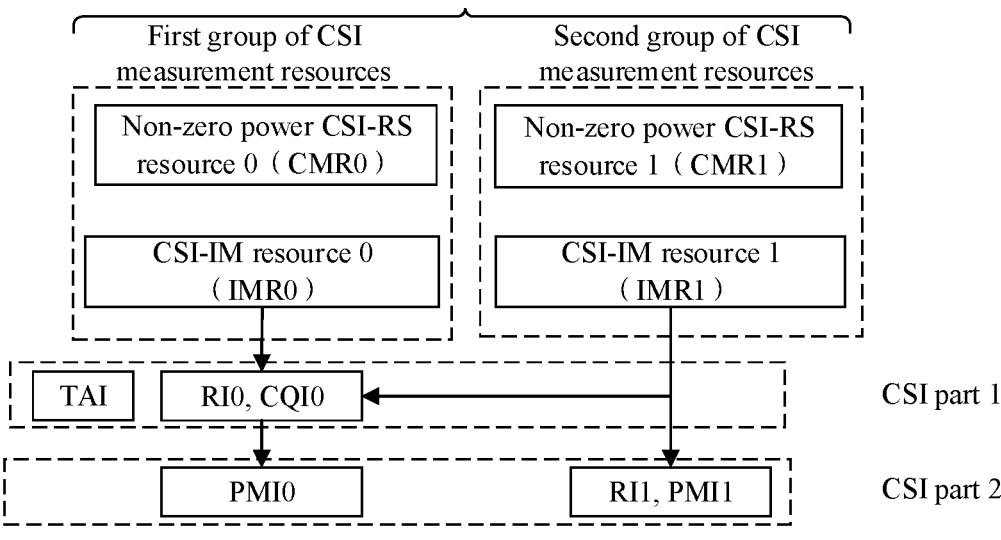
FIG. 6B is a second composition diagram of CSI provided by an embodiment of the disclosure.
Figure 6C:
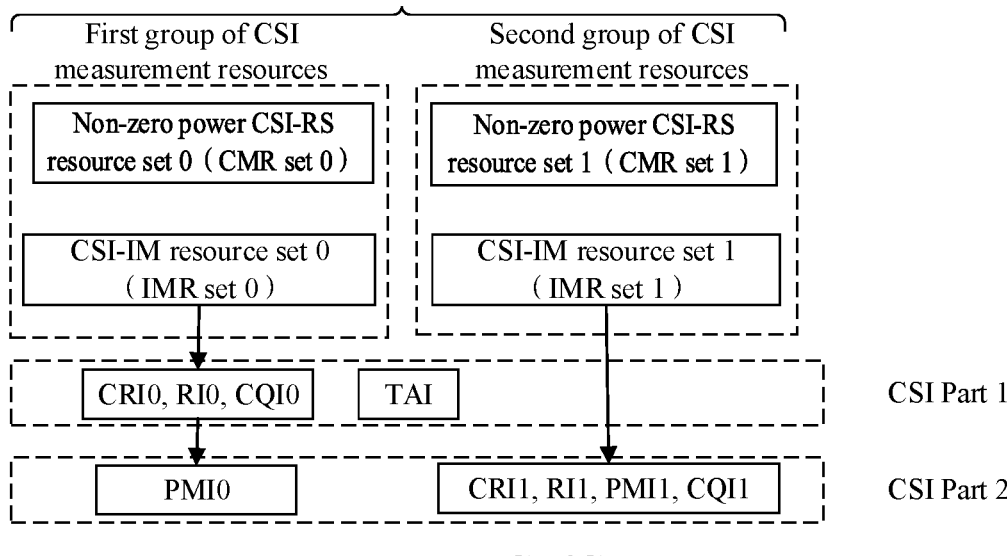
FIG. 6C is a third composition diagram of CSI provided by an embodiment of the disclosure.

In an example, the second value is 1 or 2. In this case, the reporting of the CSI is based on the transmission assumption of a plurality of TRPs or the reporting of the CSI is based on the measurement assumption of a plurality of measurement resources. As shown in FIG. 6B and FIG. 6C, information in the CSI is obtained by performing measurement based on a first group of CSI measurement resources (i.e., CMR0 and IMR0) and a second group of CSI measurement resources (i.e., CMR1 and IMR1). The terminal device needs to report the uplink control information corresponding to two TRPs or two measurement resources.

Optionally, the value of k may be determined according to a CSI reporting configuration corresponding to the CSI, or the number of CORESET group indexes configured by a network device, or the value of the TAI. For example, the value of k may be indicated in the CSI reporting configuration corresponding to the CSI. For example, when the number of the CORESET group indexes configured by the network device is 1, k=0; and when the number of the CORESET group indexes configured by the network device is 2, k=1. For example, when the value of the TAI is 1, k=0; and when the value of the TAI is 2, k=1.

The contents included in CSI Part 1 and CSI Part 2 and a calculation manner for the contents are described in combination with different values of k.

First Case: k=0

Herein, when k=0, the reporting of the CSI is based on the transmission assumption of a plurality of TRPs scheduled by a single DCI (that is, two TRPs perform scheduling jointly). In this case, the CQI included in CSI Part 1 is obtained by performing calculation based on the two PMIs, and CSI Part 2 does not include a CQI.

Further, CSI Part 2 may further include one RI. The one RI and the RI included in CSI Part 1 are obtained by performing measurement based on different measurement resources.

For example, as shown in FIG. 6B, CSI Part 1 includes TAI, RI0, and CQI0. CSI Part 2 includes RI1, PMI0, and PMI1. RI0 and PMI0 are obtained by performing measurement based on a group of CMR and IMR (i.e., CMR0 and IMR0). RI1 and PMI2 are obtained by performing measurement based on another group of CMR and IMR (i.e., CMR1 and IMR1). CQI0 is obtained by performing calculation based on the channel estimated by the terminal device, PMI0, and PMI1, that is, CQI0 is the CQI jointly estimated based on channel measurement results of two TRPs.

It is to be noted that FIG. 6B illustrates that each of the two groups of CSI measurement resources configured by the network device only includes one CMR and one IMR. At this case, the terminal device does not need to report the CRI.

Further, optionally, in a case that a group of CSI measurement resources configured by the network device includes a plurality of measurement resources (such as a plurality of CMRs and a plurality of IMRs), CSI Part 2 may further include one CRI, and the one CRI and the CRI included in CSI Part 1 are obtained by performing measurement based on different measurement resource sets. For example, CSI Part 1 includes CRI0, and CRI Part 2 includes CRI1. CMR0 and IMR0 are a group of CMR and IMR corresponding to CRI0. CMR1 and IMR1 are a group of CMR and IMR corresponding to CRI1.

Second Case: k=1

Herein, when k=1, the reporting of the CSI is based on the transmission assumption of a plurality of TRPs scheduled by a plurality of DCIs (that is, two TRPs performs scheduling independently). The CQI included in CSI Part 2 and the CQI included in CSI Part 1 are obtained by performing calculation based on the two PMIs, respectively.

Further, CSI Part 2 may further include one RI, and the RI and the RI included in CSI Part 1 are obtained by performing measurement based on different measurement resources. The two PMIs are obtained based on the RI in CSI Part 1 and the RI in CSI Part 2, respectively.

Further, optionally, in a case that a group of CSI measurement resources configured by the network device includes a plurality of measurement resources (such as a plurality of CMRs and a plurality of IMRs), CSI Part 2 may further include one CRI, and the one CRI and the CRI included in CSI Part 1 are obtained by performing measurement based on different measurement resource sets. Herein, assuming that a group of CSI measurement resources includes a plurality of CMRs and a plurality of IMRs, the terminal device needs to select one CMR and one IMR therefrom and report the corresponding CRI. For example, as shown in FIG. 6C, CSI Part 1 includes CRI0, RI0, CQI0, and TAI, and CSI Part 2 includes CRI1, RI1, PMI0, PMI1, and CQI1. RI0, PMI0 and CQI0 are obtained by performing measurement based on a group of CMR and IMR (i.e., CMR0 and IMR0) (CMR0 and IMR0 are a group of CMR and IMR corresponding to CRI0). RI1, PMI1 and CQI1 are obtained by performing measurement based on another group of CMR and IMR (i.e., CMR1 and IMR1) (CMR1 and IMR1 are a group of CMR and IMR corresponding to CRI1).

In the above two cases, the sum of the RIs in CSI Part 1 and CSI Part 2 cannot exceed the maximum number of transmission layers supported by the terminal device. Further, the sum of the RIs in CSI Part 1 and CSI Part 2 also cannot exceed 4.

In an implementation, the terminal device or the network device may determine the number of bits of the information included in CSI Part 2 based on the assumption information, so as to perform generation or detection for CSI Part 2.

It is to be noted that the assumption information on which the CSI reporting is based corresponds to the number of the PMIs/CQIs included in the CSI. Therefore, the assumption information may also be the information of the number of PMIs or the information of the number of CQIs, that is, the assumption information may be used for indicating the number of the PMIs included in the CSI or the number of the CQIs included in the CSI.

According to the technical solution of the embodiment of the disclosure, the terminal device indicates a transmission assumption or a measurement assumption with the best performance currently through the assumption information. The network device may perform scheduling for downlink transmission based on the transmission assumption or the measurement assumption, so as to support flexible switching between different transmission solutions. Meanwhile, since the terminal device only needs to report the CSI corresponding to one transmission assumption or one measurement assumption, and does not need to report the CSI corresponding to a plurality of transmission assumptions or a plurality of measurement assumptions, the overhead of CSI feedback can be reduced significantly. Further, the content included in CSI Part 2 is determined according to the assumption information in CSI Part 1, and the bit number and occupied resources of CSI Part 2 can be flexibly adjusted based on different feedback contents, so as to avoid unnecessary uplink resource waste.

At step S504, the terminal device reports the CSI according to the determined CSI Part 1 and CSI part 2.

Herein, the CSI includes CSI Part 1 and CSI Part 2. Optionally, CSI Part 1 and CSI Part 2 may be reported with reference to the methods in related arts.

When the code rate of the PUSCH or the PUCCH bearing CSI Part 2 exceeds a preset threshold value, the information with low priority is discarded first according to the priority sequence of a plurality of pieces of information in CSI Part 2. Herein, the threshold value may be calculated by the terminal device or may be configured to the terminal device by the network device.

In an optional manner, the priority of the PMI, corresponding to the RI in CSI Part 1, in CSI Part 2 is higher than the priority of other information in CSI Part 2.

Second Application Example

Referring to FIG. 7, the CSI reporting method of the present application example includes steps S701 to S704.

At step S701, a network device configures two groups of CSI measurement resources in a CSI reporting configuration.

Herein, the two groups of CSI measurement resources respectively correspond to two TRPs that cooperate with each other. Each group of CSI measurement resources includes at least one measurement resource (i.e., at least one CMR and at least one IMR) corresponding to one TRP.

At step S702, the terminal device performs measurement based on these two groups of CSI measurement resources to obtain corresponding two RIs, and reports the two RIs through CSI Part 1 that constitutes CSI.

Herein, the first group of CSI measurement resources corresponds to the first RI of the two RIs, and the second group of CSI measurement resources corresponds to the second RI of the two RIs.

At step S703, the terminal device determines a PMI and/or a CQI included in CSI Part 2 that constitutes the CSI according to the values of the two RIs in CSI Part 1.

The uplink control information included in CSI Part 2 is described below.

In an implementation, when the value of one of the two RIs (i.e., the first RI) is 0, and the value of the other RI (i.e., the second RI) is not 0, CSI Part 2 includes only one PMI, and the PMI corresponds to the second RI (that is, the number of columns of the PMI is equal to the second RI, or the PMI is obtained by performing calculation based on the second RI).

At this case, the reporting of the CSI is based on the transmission assumption of a single TRP or the reporting of the CSI is based on the measurement assumption of a single measurement resource. As shown in FIG. 8A, all information in the CSI is obtained by performing measurement based on a first group of CSI measurement resources (i.e., CMR0 and IMR0).

Further, CSI Part 1 may include one CQI. For example, as shown in FIG. 8A, CSI Part 1 includes RI0>0, RI1=0, and CQI; and CSI Part 2 includes a PMI. Further, optionally, if the value of RI0 is greater than 4, CSI Part 2 may further include another CQI. The CQI in CSI Part 1 corresponds to a first codeword, and the CQI in CSI Part 2 corresponds to a second codeword.

When the value of one of the two RIs is 0, the value of the other non-zero RI is not limited.

In another implementation, if the values of both two RIs are greater than 0, then CSI Part 2 includes two PMIs and k CQI, and k=0 or 1. The two PMIs correspond to the two RIs, respectively.

Herein, the two PMIs are obtained by performing measurement based on the same measurement resources as the two RIs, respectively. For example, the first PMI of the two PMIs is obtained by performing measurement based on the same measurement resource (such as the first group of CSI measurement resources) as the first RI of the two RIs, and the second PMI of the two PMIs is obtained by performing measurement based on the same measurement resource (such as the second group of CSI measurement resources) as the second RI of the two RIs.

Figure 8B:
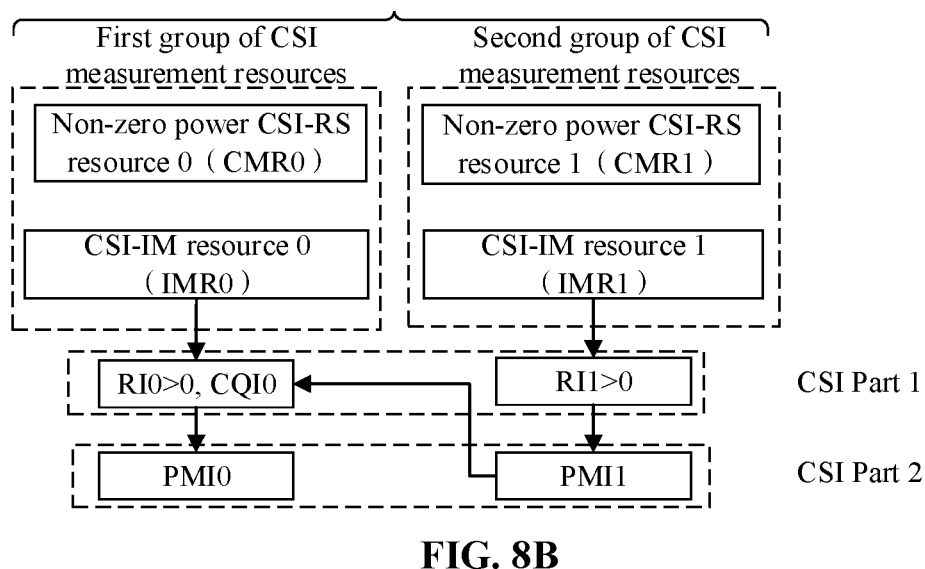
FIG. 8B is a fifth composition diagram of CSI provided by an embodiment of the disclosure.
Figure 8C:
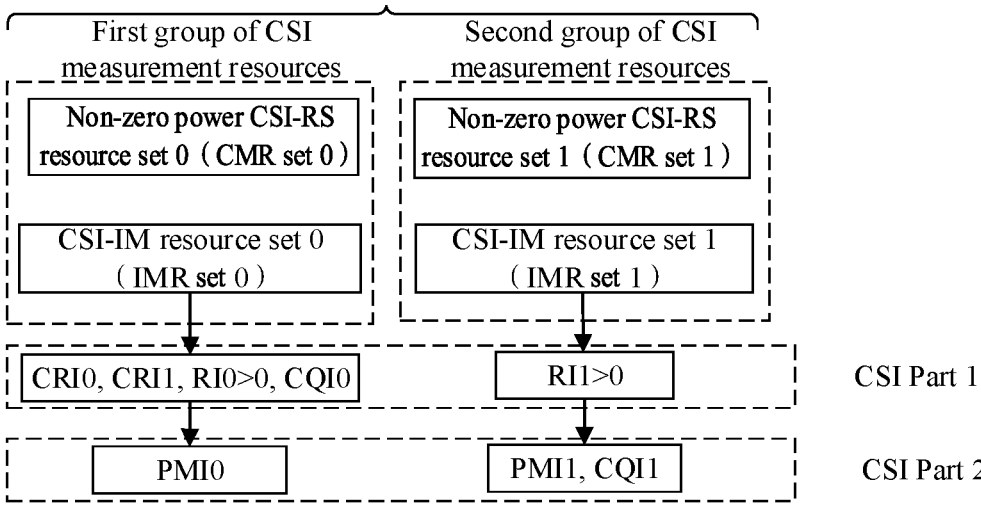
FIG. 8C is a sixth composition diagram of CSI provided by an embodiment of the disclosure.

At this case, the reporting of the CSI is based on the transmission assumption of a plurality of TRPs or the reporting of the CSI is based on the measurement assumption of a plurality of measurement resources. As shown in FIG. 8B and FIG. 8C, information in the CSI is obtained by performing measurement based on a first group of CSI measurement resources (i.e., CMR0 and IMR0) and a second group of CSI measurement resources (i.e., CMR1 and IMR1). The terminal device needs to report the uplink control information corresponding to two TRPs or two measurement resources.

Optionally, the value of k may be determined according to a CSI reporting configuration corresponding to the CSI, or the number of CORESET group indexes configured by the network device. For example, the value of k may be indicated in the CSI reporting configuration corresponding to the CSI. For example, when the number of the CORESET group indexes configured by the network device is 1, k=0; and when the number of the CORESET group indexes configured by the network device is 2, k=1.

The contents included in CSI Part 1 and CSI Part 2 and a calculation method for the content are described in combination with different values of k.

First Case: k=0

Herein, when k=0, the reporting of the CSI is based on the transmission assumption of a plurality of TRPs scheduled by a single DCI (that is, two TRPs performs scheduling jointly). At this case, the CQI included in CSI Part 1 is calculated based on the two RIs and the two PMIs, and CSI Part 2 does not include a CQI.

For example, as shown in FIG. 8B, CSI Part 1 includes RI0>0, RI1>0, and CQI0. CSI Part 2 includes PMI0 and PMI1. RI0 and PMI1 are obtained by performing measurement based on a group of CMR and IMR (i.e., CMR0 and IMR0). RI1 and PMI1 are obtained by performing measurement based on a group of CMR and IMR (i.e., CMR1 and IMR1). CQI0 is obtained by performing calculation based on the channel estimated by the terminal device, PMI0, and PMI1, that is, CQI0 is the CQI jointly estimated based on channel measurement results of two TRPs.

It is to be noted that FIG. 8B illustrates that each of the two groups of CSI measurement resources configured by the network device only include one CMR and one IMR. At this case, the terminal device does not need to report the CRI.

Further, optionally, in a case that a group of CSI measurement resources configured by the network device includes a plurality of measurement resources (such as a plurality of CMRs and a plurality of IMRs), CSI Part 1 may further include two CRIs, and the two CRIs are obtained by performing measurement based on different measurement resource sets. For example, CSI Part 1 further includes CRI0 and CRI1. CMR0 and IMR0 are a group of CMR and IMR corresponding to CRI0. CMR1 and IMR1 are a group of CMR and IMR corresponding to CRI1.

Second Case: k=1

Herein, when k=1, the reporting of the CSI is based on the transmission assumption of a plurality of TRPs scheduled by a plurality of DCIs (that is, two TRPs performs scheduling independently). The CQI included in CSI Part 2 and the CQI included in CSI Part 1 are obtained by performing calculation based on the two PMIs, respectively.

Further, optionally, in a case that a group of CSI measurement resources configured by the network device includes a plurality of measurement resources (such as a plurality of CMRs and a plurality of IMRs), CSI may further include two CRIs, and the two CRIs are obtained by performing measurement based on different measurement resource sets. Herein, assuming that a group of CSI measurement resources includes a plurality of CMRs and a plurality of IMRs, the terminal device needs to select one CMR and one IMR therefrom and report the corresponding CRI. Two groups of CSI measurement resources correspond to two CRIs. Both the CRIs may be in CSI Part 1 or may be in CSI Part 2, or one CRI is in CSI Part 1 and the other CRI is in CSI Part 2. For example, as shown in FIG. 8C, CSI Part 1 includes CRI0, CRI1, RI0>0, RI1>0, and CQI0. CSI Part 2 includes PMI0, PMI1, and CQI1. RI0, PMI0, and CQI0 are obtained by performing measurement based on a group of CMR and IMR (i.e., CMR0 and IMR0) (CMR0 and IMR0 are a group of CMR and IMR corresponding to CRI0). RI1, PMI1, and CQI1 are obtained by performing measurement based on the other group of CMR and IMR (i.e., CMR1 and IMR1) (CMR1 and IMR1 are a group of CMR and IMR corresponding to CRI1).

In the above solution, when the two RIs are greater than 0, the sum of the two RIs cannot exceed the maximum number of transmission layers supported by the terminal device. Further, the sum of the two RIs also cannot exceed 4.

In an implementation, the terminal device or the network device may determine the number of bits of the information included in CSI Part 2 based on the values of the two RIs, so as to perform generation or detection for CSI Part 2.

According to the technical solution of the embodiment of the disclosure, the terminal device indicates different transmission solutions (equivalent to a transmission assumption or a measurement assumption) through the values of two RIs, and the network device may perform scheduling for the downlink transmission based on the transmission solutions corresponding to the values of the two RIs, such that flexible switching between different transmission solutions can be supported. Meanwhile, since the terminal device only needs to report the CSI corresponding to the best transmission assumption, and does not need to report the CSI corresponding to a plurality of transmission assumptions, the overhead of CSI feedback can be reduced significantly. Further, the content included in CSI Part 2 is determined according to the value of the RI in CSI Part 1, and the bit number and occupied resources of CSI Part 2 can be flexibly adjusted based on different feedback contents, so as to avoid unnecessary uplink resource waste.

At step S704, the terminal device reports the CSI according to the determined CSI Part 1 and CSI part 2.

Herein, the CSI comprises CSI Part 1 and CSI Part 2. Optionally, CSI Part 1 and CSI Part 2 may be reported with reference to the methods in related arts.

When the code rate of the PUSCH or the PUCCH bearing CSI Part 2 exceeds a preset threshold value, the information with low priority is discarded first according to the priority sequence of a plurality of pieces of information in CSI Part 2. Herein, the threshold value may be calculated by the terminal device or may be configured to the terminal device by the network device.

In an optional manner, the priority of the PMI, corresponding to the first RI of CSI Part 1, in CSI Part 2 is higher than the priority of other information in CSI Part 2.

FIG. 9 is a schematic diagram of structural compositions of a CSI reporting device provided by an embodiment of the disclosure, which is applied to a terminal device. As shown in FIG. 9, the CSI reporting device includes a determination unit 901 and a transmitting unit 902.

The determination unit 901 is configured to determine second information in a second CSI part according to first information in a first CSI part. The first information is assumption information or two RIs. The assumption information is used for indicating a transmission assumption or a measurement assumption on which reporting the CSI is based. The two RIs are obtained by performing measurement based on different measurement resources. The second information includes at least one of: a PMI, or a CQI.

The transmitting unit 902 is configured to report CSI. The CSI includes the first CSI part and the second CSI part.

In an optional manner, the assumption information is used for indicating whether reporting the CSI is based on the transmission assumption of a single TRP or based on the transmission assumption of a plurality of TRPs, or the assumption information is used for indicating whether reporting the CSI is based on the measurement assumption of a single measurement resource or based on the measurement assumption of a plurality of measurement resources.

In an optional manner, the first information is assumption information.

The determination unit 901 is configured to: determine that the second CSI part includes one PMI in a case that the value of the assumption information is a first value, and determine that the second CSI part includes two PMIs and k CQI in a case that the value of the assumption information is a second value. The value of k is 0 or 1.

In an optional manner, all information in the CSI is obtained by performing measurement based on a single measurement resource in a case that the value of the assumption information is the first value.

In an optional manner, the two PMIs are obtained by performing measurement based on different measurement resources.

In an optional manner, the CQI included in the first CSI part is obtained by performing calculation based on the two PMIs in a case that the value of k is 0.

In an optional manner, in a case that the value of k is 1, the CQI included in the first CSI part is obtained by performing calculation based on the first PMI of the two PMIs, and the CQI included in the second CSI part is obtained by performing calculation based on the second PMI of the two PMIs.

In an optional manner, the value of k is determined according to a CSI reporting configuration corresponding to the CSI, or the number of CORESET group indexes configured by a network device, or the value of assumption information.

In an optional manner, in a case that the value of the assumption information is a second value, the second CSI part includes one RI, and the one RI and the RI included in the first CSI part are obtained by performing measurement based on different measurement resources.

In an optional manner, the sum of the RI included in the second CSI part and the RI included in the first CSI part is less than or equal to the maximum number of transmission layers supported by the terminal device.

In an optional manner, in a case that the value of the assumption information is a second value, the second CSI part includes one CRI, and the one CRI and the CRI included in the first CSI part are obtained by performing measurement based on different measurement resource sets.

In an optional manner, the first information is two RIs.

The determination unit 901 is configured to determine that the second CSI part includes one PMI in a case that the value of the first RI of the two RIs is 0 and the value of the second RI of the two RIs is not 0.

In an optional manner, both the PMI and the CQI included in the CSI are obtained by performing calculation based on the second RI.

In an optional manner, the first information is two RIs.

The determination unit 901 is configured to determine that the second CSI part includes two PMIs and k CQI in a case that both the value of the first RI of the two RIs and the value of the second RI of the two RIs are greater than 0. The value of k is 0 or 1. The first PMI of the two PMIs corresponds to the first RI, and the second PMI of the two PMIs corresponds to the second RI.

In an optional manner, the CQI included in the first CSI part is obtained by performing calculation based on the two RIs and the two PMIs in a case that the value of k is 0.

In an optional manner, in a case that the value of k is 1, the CQI included in the first CSI part is obtained by performing calculation based on the first PMI of the two PMIs, and the CQI included in the second CSI part is obtained by performing calculation based on the second PMI of the two PMIs.

In an optional manner, the value of k is based on a CSI reporting configuration corresponding to the CSI, or the number of CORESET group indexes configured by a network device.

In an optional manner, the first CSI part or the second CSI part includes two CRIs, and the two CRIs are obtained by performing measurement based on different measurement resource sets.

In an optional manner, the sum of the two RIs is less than or equal to the maximum number of transmission layers supported by the terminal device.

In an optional manner, the device further includes a processing unit.

The processing unit (not shown in the drawings) is configured to discard at least one piece of a plurality of pieces of information in the second CSI part according to the priority sequence of the plurality of pieces of information in a case that the code rate of a PUSCH or a PUCCH bearing the second CSI part exceeds a first threshold value. The priority corresponding to the discarded information is lower than the priority corresponding to the information not to be discarded.

The priority of the first PMI in the second CSI part is higher than the priority of other information in the second CSI part, and there is a corresponding relationship between the first PMI and the RI of the first CSI part.

In an optional manner, the device further includes a processing unit.

The processing unit is configured to discard at least one piece of a plurality of pieces of information in the second CSI part according to the priority sequence of the plurality of pieces of information in a case that the code rate of a PUSCH or a PUCCH bearing the second CSI part exceeds a first threshold value. The priority corresponding to the discarded information is lower than the priority corresponding to the information not to be discarded.

The priority of the first PMI in the second CSI part is higher than the priority of other information in the second CSI part, and there is a corresponding relationship between the first PMI and the first RI of the two RIs included in the first CSI part.

In an optional manner, the measurement resource includes a CMR and/or an IMR.

It is to be understood for those skilled in the art that the relevant description of the abovementioned CSI reporting device of the embodiments of the disclosure can be understood with reference to the relevant description of the CSI reporting and receiving method of the embodiments of the disclosure.

FIG. 10 is a schematic diagram of structural compositions of a CSI receiving device provided by an embodiment of the disclosure, which is applied to a network device. As shown in FIG. 10, the CSI receiving device includes a receiving unit 1001.

The receiving unit 1001 receives the CSI reported by a terminal device. The CSI includes a first CSI part and a second CSI part. Second information in the second CSI part is determined based on first information in the first CSI part. The first information is assumption information or two RIs. The assumption information is used for indicating a transmission assumption or a measurement assumption on which reporting the CSI is based. The two RIs are obtained by performing measurement based on different measurement resources. The second information includes at least one of: a PMI, or a CQI.

In an optional manner, the assumption information is used for indicating whether the CSI reporting is based on the transmission assumption of a single TRP or based on the transmission assumption of a plurality of TRPs, or the assumption information is used for indicating whether the CSI reporting is based on the measurement assumption of a single measurement resource or based on the measurement assumption of a plurality of measurement resources.

In an optional manner, the first information is assumption information.

The second CSI part includes one PMI in a case that the value of the assumption information is a first value.

The second CSI part includes two PMIs and k CQI in a case that the value of the assumption information is a second value, and the value of k is 0 or 1.

In an optional manner, all information in the CSI is obtained by performing measurement based on a single measurement resource in a case that the value of the assumption information is the first value.

In an optional manner, the two PMIs are obtained by performing measurement based on different measurement resources.

In an optional manner, the CQI included in the first CSI part is obtained by performing calculation based on the two PMIs in a case that the value of k is 0.

In an optional manner, in a case that the value of k is 1, the CQI included in the first CSI part is obtained by performing calculation based on the first PMI of the two PMIs, and the CQI included in the second CSI part is obtained by performing calculation based on the second PMI of the two PMIs.

In an optional manner, the value of k is determined according to a CSI reporting configuration corresponding to the CSI, or the number of control resource set CORESET group indexes configured by a network device, or the value of assumption information.

In an optional manner, in a case that the value of the assumption information is a second value, the second CSI part includes one RI, and the one RI and the RI included in the first CSI part are obtained by performing measurement based on different measurement resources.

In an optional manner, the sum of the RI included in the second CSI part and the RI included in the first CSI part is less than or equal to the maximum number of transmission layers supported by the terminal device.

In an optional manner, in a case that the value of the assumption information is a second value, the second CSI part includes one RI, and the one RI and the RI included in the first CSI part are obtained by performing measurement based on different measurement resource sets.

In an optional manner, the first information is two RIs.

The second CSI part includes one PMI in a case that the value of the first RI of the two RIs is 0 and the value of the second RI of the two RIs is not 0.

In an optional manner, both the PMI and the CQI included in the CSI are obtained by performing calculation based on the second RI.

In an optional manner, the first information is two RIs.

The second CSI part includes two PMIs and k CQI in a case that both values of the first RI and the second RI of the two RIs are greater than 0. The value of k is 0 or 1. The first PMI of the two PMIs corresponds to the first RI, and the second PMI of the two PMIs corresponds to the second RI.

In an optional manner, the CQI included in the first CSI part is obtained by performing calculation based on the two RIs and the two PMIs in a case that the value of k is 0.

In an optional manner, in a case that the value of k is 1, the CQI included in the first CSI part is obtained by performing calculation based on the first PMI of the two PMIs, and the CQI included in the second CSI part is obtained by performing calculation based on the second PMI of the two PMIs.

In an optional manner, the value of k is determined according to a CSI reporting configuration corresponding to the CSI, or the number of CORESET group indexes configured by a network device.

In an optional manner, the first CSI part or the second CSI part includes two CRIs, and the two CRIs are obtained by performing calculation based on different measurement resource sets.

In an optional manner, the sum of the two RIs is less than or equal to the maximum number of transmission layers supported by the terminal device.

In an optional manner, the measurement resource includes a CMR and/or an IMR.

Those skilled in the art should understand that the relevant description of the abovementioned CSI receiving device of the embodiments of the disclosure can be understood with reference to the relevant description of the CSI reporting and receiving method of the embodiments of the disclosure.

FIG. 11 is a schematic structural diagram of a communication device 1100 provided by an embodiment of the disclosure. The communication device 1100 may be a terminal device, or may be a network device. The communication device 1100 as shown in FIG. 11 includes a processor 1110. The processor 1110 may call and run a computer program from a memory to implement the method in the embodiment of the disclosure.

Optionally, as shown in FIG. 11, the communication device 1100 may further include a memory 1120. The processor 1110 may call and run the computer program from the memory 1120 to implement the method in the embodiments of the disclosure.

The memory 1120 may be independent from the processor 1110, or may be integrated into the processor 1110.

Optionally, as shown in FIG. 11, the communications device 1100 may also include a transceiver 1130. The processor 1110 may control the transceiver 1130 to be in communication with other devices, specifically, to send information or data to other devices, or receive the information or data sent by other devices.

The transceiver 1130 may include a transmitter and a receiver. The transceiver 1130 may further include an antenna. There may be one or more antennas.

Optionally, the communications device 1100 may specifically be a network device of the embodiment of the disclosure, and the communication device 1100 may implement corresponding flows implemented by the network device in various methods of the embodiments of the disclosure, which will not be elaborated here for simplicity.

Optionally, the communications device 1100 may specifically be a mobile terminal/a terminal device of the embodiment of the disclosure, and the communication device 1100 may implement corresponding flows implemented by the mobile terminal/the terminal device in various methods of the embodiments of the disclosure, which will not be elaborated here for simplicity.

Figure 12:
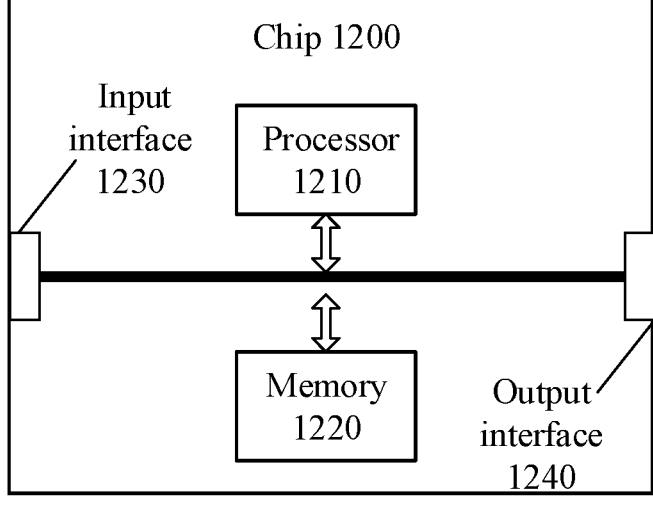
FIG. 12 is a schematic structural diagram of a chip of an embodiment of the disclosure.

FIG. 12 is a schematic structural diagram of a chip of an embodiment of the disclosure. The chip 1200 as shown in FIG. 12 includes a processor 1210. The processor 1210 may call and run a computer program from a memory 1220 to implement the method in the embodiments of the disclosure.

Optionally, an input interface 1230 and an output interface 1240 are further included.

Figure 13:
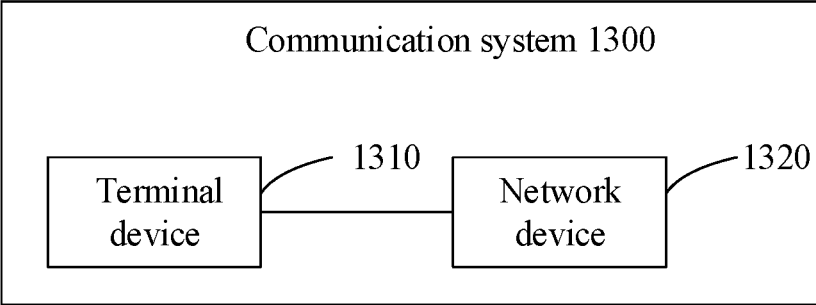
FIG. 13 is a schematic block diagram of a communication system provided by an embodiment of the disclosure.

FIG. 13 is a schematic block diagram of a communication system 1300 provided by an embodiment of the disclosure. As shown in FIG. 13, the communication system 1300 includes a terminal device 1310 and a network device 1320.

The terminal device 1310 may be configured to implement corresponding functions implemented by the terminal device in the abovementioned method, and the network device 1320 may be configured to implement corresponding functions implemented by the network device in the abovementioned method, which will not be elaborated here for simplicity.

The embodiments of the disclosure further provide a computer program product, which includes a computer program instruction.

Optionally, the computer program product may be applied to a network device in the embodiments of the disclosure. The computer program instruction enables a computer to execute corresponding flows implemented by the network device in each method of the embodiments of the disclosure, which will not be elaborated here for simplicity.

Optionally, the computer program product may be applied to a mobile terminal/a terminal device in the embodiments of the disclosure. The computer program instruction enables a computer to execute corresponding flows implemented by the mobile terminal/the terminal device in each method of the embodiments of the disclosure, which will not be elaborated here for simplicity.

The embodiments of the disclosure further provide a computer program.

Optionally, the computer program may be applied to a network device in the embodiments of the disclosure. The computer program runs in a computer to enable the computer to execute corresponding flows implemented by the network device in each method of the embodiments of the disclosure, which will not be elaborated here for simplicity.

Optionally, the computer program may be applied to a mobile terminal/a terminal device in the embodiments of the disclosure. When running on a computer, the computer program enables a computer to execute corresponding flows implemented by the mobile terminal/the terminal device in each method of the embodiments of the disclosure, which will not be elaborated here for simplicity.

Those of ordinary skilled in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. Those skilled in the art may implement the described functions in different ways for each specific application, but such implementation should not be considered beyond the scope of the disclosure.

It is to be clearly understood for a person skilled in the art that, for the purpose of convenient and brief description, for a detailed working process of the foregoing system, device, and unit, reference may be made to a corresponding process in the foregoing method embodiments, and details are not described again herein.

In the several embodiments provided in the disclosure, it is to be understood that the disclosed system, device, and method may be implemented in other manners. For example, the described device embodiment is merely schematic. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the devices or units may be implemented in electronic, mechanical, or other forms.

The units described as separate parts may or may not be physically separate, and parts displayed as units may or may not be physical units, may be located in one location, or may be distributed on a plurality of network elements. Some or all of the units may be selected based on actual requirements to achieve the objectives of the solutions of the embodiments.

In addition, functional units in the embodiments of the disclosure may be integrated into one processing unit, or each of the units may exist alone physically, or two or more units are integrated into one unit.

When the functions are implemented in a form of a software functional unit and sold or used as an independent product, they may be stored in a computer readable storage medium. Based on such an understanding, the technical solutions of the disclosure essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of the disclosure. The above-mentioned storage medium includes: various media capable of storing program codes such as a U disk, a mobile hard disk, a Read-Only Memory (ROM), a Radom Access Memory (RAM), a magnetic disk or an optical disk.

The above descriptions are merely specific implementations of the disclosure, but are not intended to limit the scope of protection of the disclosure. Any variation or replacement readily figured out by a person skilled in the art within the technical scope disclosed in the disclosure shall fall within the scope of protection of the disclosure. Therefore, the scope of protection of the disclosure shall be subject to the scope of protection of the claims.

The invention claimed is:

1. A method for reporting Channel State Information (CSI), comprising:
   determining, by a terminal device, second information in a second CSI part according to first information in a first CSI part, wherein the first information is assumption information, the assumption information is used for indicating a transmission assumption or a measurement assumption on which reporting the CSI is based, and the second information comprises at least one of: a Precoding Matrix Indicator (PMI), or a Channel Quality Indicator (CQI); and
   wherein the determining, by the terminal device, the second information in the second CSI part according to the first information in the first CSI part comprises:
   determining, by the terminal device, that the second CSI part comprises one PMI in a case that a value of the assumption information is a first value; and
   determining, by the terminal device, that the second CSI part comprises two PMIs and k CQI in a case that the value of the assumption information is a second value, wherein a value of k is 0 or 1;
   wherein the value of the assumption information is either the first value or the second value;
   wherein the first CSI part include a CQI,
   in response to determining that the value of k is 0, the CQI comprised in the first CSI part is obtained, by the terminal device, by performing calculation based on the two PMIs of the second CSI part;
   reporting, by the terminal device, the CSI, wherein the CSI comprises the first CSI part and the second CSI part.

2. The method of claim 1, wherein
   the assumption information is used for indicating whether reporting the CSI is based on the measurement assumption of a single measurement resource or the measurement assumption of a plurality of measurement resources.

3. The method of claim 2, wherein the measurement resource comprises at least one of: a Channel Measurement Resource (CMR), or an Interference Measurement Resource (IMR).

4. The method of claim 1, wherein all information in the CSI is obtained by performing measurement based on a single measurement resource in a case that the value of the assumption information is the first value.

5. The method of claim 1, wherein the two PMIs are obtained by performing measurement based on different measurement resources.

6. The method of claim 1, wherein in response to determining that the value of k is 1, the CQI comprised in the first CSI part is obtained by performing calculation based on a first PMI of the two PMIs, and CQI comprised in the second CSI part is obtained by performing calculation based on a second PMI of the two PMIs.

7. The method of claim 1, wherein the value of k is determined according to a CSI reporting configuration corresponding to the CSI, or a number of Control Resource Set (CORESET) group indexes configured by a network device, or the value of the assumption information.

8. The method of claim 1, wherein in a case that the value of the assumption information is the second value, the second CSI part further comprises one Rank Indicator (RI), and the one RI and a RI comprised in the first CSI part are obtained by performing measurement based on different measurement resources.

9. The method of claim 8, wherein a sum of the RI comprised in the second CSI part and the RI comprised in the first CSI part is less than or equal to a maximum number of transmission layers supported by the terminal device.

10. The method of claim 1, wherein in a case that the value of the assumption information is the second value, the second CSI part further comprises one Channel state information reference signal Resource Indicator (CRI), and the one CRI and the CRI comprised in the first CSI part are obtained by performing measurement based on different measurement resource sets.

11. The method of claim 1, further comprising:

discarding, by the terminal device, at least one piece of a plurality of pieces of information in the second CSI part according to a priority sequence of the plurality of pieces of information in a case that a code rate of a Physical Uplink Shared Channel (PUSCH) or a Physical Uplink Control Channel (PUCCH) bearing the second CSI part exceeds a first threshold value, wherein a priority corresponding to the discarded information is lower than a priority corresponding to information not to be discarded;

a priority of a first PMI in the second CSI part is higher than a priority of other information in the second CSI part, and there is a corresponding relationship between the first PMI and a RI of the first CSI part.

12. A method for receiving Channel State Information (CSI), comprising:

receiving, by a network device, the CSI reported by a terminal device, wherein the CSI comprises a first CSI part and a second CSI part; second information in the second CSI part is determined based on first information in the first CSI part; the first information is assumption information; the assumption information is used for indicating a transmission assumption or a measurement assumption on which reporting the CSI is based; and the second information comprises at least one of: a Precoding Matrix Indicator (PMI), or a Channel Quality Indicator (CQI);

wherein the second CSI part comprises one PMI in a case that a value of the assumption information is a first value; and the second CSI part comprises two PMIs and k CQI in a case that the value of the assumption information is a second value, and a value of k is 0 or 1;

wherein the value of the assumption information is either the first value or the second value;

wherein the first CSI part include a CQI, in response to determining that the value of k is 0, the CQI comprised in the first CSI part is obtained by performing calculation based on the two PMIs of the second CSI part.

13. The method of claim 12, wherein the assumption information is used for indicating whether reporting the CSI is based on the measurement assumption of a single measurement resource or the measurement assumption of a plurality of measurement resources.

14. The method of claim 12, wherein all information in the CSI is obtained by performing measurement based on a single measurement resource in a case that the value of the assumption information is the first value.

15. The method of claim 12, wherein the two PMIs are obtained by performing measurement based on different measurement resources.

16. A terminal device, comprising a processor and a memory, wherein the memory is configured to store a computer program, and the processor is configured to call and run the computer program stored in the memory to perform following operations:

determining second information in a second CSI part according to first information in a first CSI part, wherein the first information is assumption information, the assumption information is used for indicating a transmission assumption or a measurement assumption on which reporting the CSI is based, and the second information comprises at least one of: a Precoding Matrix Indicator (PMI), or a Channel Quality Indicator (CQI); and wherein the processor is specifically configured to perform following operations:

determining that the second CSI part comprises one PMI in a case that a value of the assumption information is a first value; and determining that the second CSI part comprises two PMIs and k CQI in a case that the value of the assumption information is a second value, wherein a value of k is 0 or 1;

wherein the value of the assumption information is either the first value or the second value;

wherein the first CSI part include a CQI, in response to determining that the value of k is 0, the CQI comprised in the first CSI part is obtained by performing calculation based on the two PMIs of the second CSI part;

reporting the CSI, wherein the CSI comprises the first CSI part and the second CSI part.

17. The terminal device of claim 16, wherein the assumption information is used for indicating whether reporting the CSI is based on the measurement assumption of a single measurement resource or the measurement assumption of a plurality of measurement resources.

18. The terminal device of claim 17, wherein the measurement resource comprises at least one of: a Channel Measurement Resource (CMR), or an Interference Measurement Resource (IMR).

19. The terminal device of claim 16, wherein all information in the CSI is obtained by performing measurement based on a single measurement resource in a case that the value of the assumption information is the first value.

20. The terminal device of claim 16, wherein the two PMIs are obtained by performing measurement based on different measurement resources.

* * * * *